(12) United States Patent
Fan et al.

(10) Patent No.: US 8,390,587 B2
(45) Date of Patent: Mar. 5, 2013

(54) CAPACITIVE TOUCH DISPLAY DEVICE AND CAPACITIVE TOUCH PANEL

(75) Inventors: Fu-Cheng Fan, Taoyuan County (TW); Jia-Wei Hu, Taichung County (TW)

(73) Assignee: Au Optronics Corporation, Hsinchu (TW)

( * ) Notice: Subject to any disclaimer, the term of this patent is extended or adjusted under 35 U.S.C. 154(b) by 641 days.

(21) Appl. No.: 12/703,731

(22) Filed: Feb. 10, 2010

(65) Prior Publication Data

US 2011/0128249 A1 Jun. 2, 2011

(30) Foreign Application Priority Data

Nov. 27, 2009 (TW) .............................. 98140644 A

(51) Int. Cl.
*G09G 5/00* (2006.01)
(52) U.S. Cl. ..... 345/173; 345/174; 345/179; 178/18.06; 178/19.03
(58) Field of Classification Search .................. 345/173, 345/174, 179; 178/18.06, 19.03
See application file for complete search history.

(56) References Cited

U.S. PATENT DOCUMENTS

| 5,650,597 | A | 7/1997 | Redmayne |
| 5,825,351 | A | 10/1998 | Tam |
| 8,111,243 | B2* | 2/2012 | Peng et al. ..................... 345/173 |
| 2009/0096758 | A1* | 4/2009 | Hotelling et al. ............. 345/173 |
| 2009/0194344 | A1* | 8/2009 | Harley et al. ............. 178/18.06 |

* cited by examiner

*Primary Examiner* — Quan-Zhen Wang
*Assistant Examiner* — Jennifer Nguyen
(74) *Attorney, Agent, or Firm* — Jianq Chyun IP Office

(57) ABSTRACT

A capacitive touch display device includes a stylus, a display panel, and a capacitive touch unit. The stylus touches the display panel by clicking to input a touch signal and contacts the capacitive touch unit at a contact area. The capacitive touch unit is disposed on the display panel and includes a plurality of first sensing series and a plurality of second sensing series. Each of the first sensing series includes a plurality of first sensing pads electrically connected to one another. A pitch between any two adjacent first sensing pads is P. The second sensing series intersect the first sensing series. The contact area contacted by the stylus has a contact width D, and the ratio of the contact width D to the pitch P between any two adjacent first sensing pads satisfies the following ratio condition: $1.4 \leq (D/P) \leq 1.6$.

20 Claims, 7 Drawing Sheets

D/P = 0.65

D/P = 0.91

D/P = 1.17

D/P = 1.43

CAPACITIVE TOUCH DISPLAY DEVICE AND CAPACITIVE TOUCH PANEL

CROSS-REFERENCE TO RELATED APPLICATION

This application claims the priority benefit of Taiwan application serial no. 98140644, filed on Nov. 27, 2009. The entirety of the above-mentioned patent application is hereby incorporated by reference herein and made a part of specification.

BACKGROUND OF THE INVENTION

1. Field of the Invention

The invention relates to a display device and a touch panel. More particularly, the invention relates to a capacitive touch display device and a capacitive touch panel.

2. Description of Related Art

Based on different ways of sensing, touch panels are generally categorized into resistant touch panels, capacitive touch panels, optical touch panels, sonic wave touch panels, and electromagnetic touch panels. The capacitive touch panels having advantages of high response speed, favorable reliability, and durability have been widely applied to electronic devices.

Normally, the capacitive touch panel includes a plurality of first sensing series extending along a first direction and a plurality of second sensing series extending along a second direction. Each of the first sensing series includes a plurality of first sensing pads and a plurality of first bridge lines serially connected together, and each of the second sensing series includes a plurality of second sensing pads and a plurality of second bridge lines serially connected together. The first sensing pads and the second sensing pads can together form a sensing array to achieve two-dimensional sensing.

As such, when a user touches the touch panel by a stylus or a finger, the stylus or the finger induces a change of capacitance on the first sensing series and the second sensing series of the touch panel at a position where the stylus or the finger touches. The change of capacitance is transformed into a touch signal, transmitted to a control circuit board, and arithmetically processed into touch position information. After that, a proper instruction is output to operate the electronic device. Nevertheless, no matter the touch panel is touched by the stylus or the finger, the touch accuracy is far below expectation. Namely, scripts or patterns input to the touch panel are distorted or illegible. Hence, how to improve the touch accuracy of the capacitive touch panel is an important issue to be resolved in haste.

SUMMARY OF THE INVENTION

The invention is directed to a capacitive touch display device having favorable touch accuracy.

The invention is further directed to a capacitive touch panel which includes a stylus contacting the capacitive touch panel at a contact area that has a contact width. A ratio of the contact width to a pitch between any two adjacent sensing pads in a sensing series satisfies a certain ratio condition, so as to improve touch accuracy.

In the invention, a capacitive touch display device including a stylus, a display panel, and a capacitive touch unit is provided. The stylus touches the display panel by clicking to input a touch signal and contacts the capacitive touch unit at a contact area. The capacitive touch unit is disposed on the display panel and includes a plurality of first sensing series and a plurality of second sensing series. Each of the first sensing series includes a plurality of first sensing pads electrically connected to one another. A pitch between any two adjacent first sensing pads is P. The second sensing series intersect the first sensing series. The contact area contacted by the stylus has a contact width D, and the ratio of the contact width D to the pitch P between any two adjacent first sensing pads satisfies the following ratio condition: $1.4 \leq (D/P) \leq 1.6$.

According to an embodiment of the invention, any two adjacent first sensing pads in the same first sensing series are electrically connected to each other through a first bridge line.

According to an embodiment of the invention, each of the second sensing series includes a plurality of second sensing pads electrically connected to one another.

According to an embodiment of the invention, any two adjacent second sensing pads in the same second sensing series are electrically connected to each other through a second bridge line.

According to an embodiment of the invention, the contact area between the stylus and the capacitive touch unit is a circular contact area.

According to an embodiment of the invention, the contact width D of the contact area contacted by the stylus is substantially equal to a diameter of the circular contact area.

According to an embodiment of the invention, the contact area between the stylus and the capacitive touch unit is an N-regular polygonal contact area, and N is an even number.

According to an embodiment of the invention, the contact width D of the contact area contacted by the stylus is substantially equal to a length of the longest diagonal of the N-regular polygonal contact area.

According to an embodiment of the invention, the pitch P ranges from 4 mm to 10 mm.

According to an embodiment of the invention, an area of the contact area is A ranging from 47.2 $mm^2$ to 155 $mm^2$, and a ratio of the area A to the pitch P is preferably 11.8 mm $\leq (A/P) \leq$ 15.5 mm.

In the invention, a capacitive touch panel suitable for a user to use a stylus to input a touch signal by clicking is further provided. The stylus contacts the capacitive touch panel at a contact area. The capacitive touch panel includes a display panel, a plurality of first sensing series, and a plurality of second sensing series. The first sensing series are disposed on the display panel. Each of the first sensing series includes a plurality of first sensing pads electrically connected to one another. A pitch between any two adjacent first sensing pads is P. The second sensing series are disposed on the display panel and intersect the first sensing series. The contact area contacted by the stylus has a contact width D, and the ratio of the contact width D to the pitch P between any two adjacent first sensing pads satisfies the following ratio condition: $1.4 \leq (D/P) \leq 1.6$.

According to an embodiment of the invention, any two adjacent first sensing pads in the same first sensing series are electrically connected to each other through a first bridge line.

According to an embodiment of the invention, each of the second sensing series includes a plurality of second sensing pads electrically connected to one another.

According to an embodiment of the invention, any two adjacent second sensing pads in the same second sensing series are electrically connected to each other through a second bridge line.

According to an embodiment of the invention, the contact area between the stylus and the capacitive touch panel is a circular contact area.

According to an embodiment of the invention, the contact width D of the contact area contacted by the stylus is substantially equal to a diameter of the circular contact area.

According to an embodiment of the invention, the contact area between the stylus and the capacitive touch panel is an N-regular polygonal contact area, and N is an even number.

According to an embodiment of the invention, the contact width D of the contact area contacted by the stylus is substantially equal to a length of the longest diagonal of the N-regular polygonal contact area.

According to an embodiment of the invention, the pitch P ranges from 4 mm to 10 mm.

According to an embodiment of the invention, an area of the contact area is A ranging from 47.2 $mm^2$ to 155 $mm^2$, and a ratio of the area A to the pitch P is preferably 11.8 mm$\leq$ (A/P)$\leq$15.5 mm.

Based on the above, in the design of the capacitive touch panel according to the invention, the ratio of the contact width D to the pitch P between any two adjacent first sensing pads satisfies the following ratio condition: 1.4$\leq$(D/P)$\leq$1.6. Hence, when the stylus touches the display panel by clicking to input the scripts or patterns, the scripts or the patterns displayed on the display panel resemble the actually input scripts or patterns. That is to say, said design can effectively improve the touch accuracy of the capacitive touch panel, and the capacitive touch display device adopting this capacitive touch panel can also have favorable touch accuracy.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
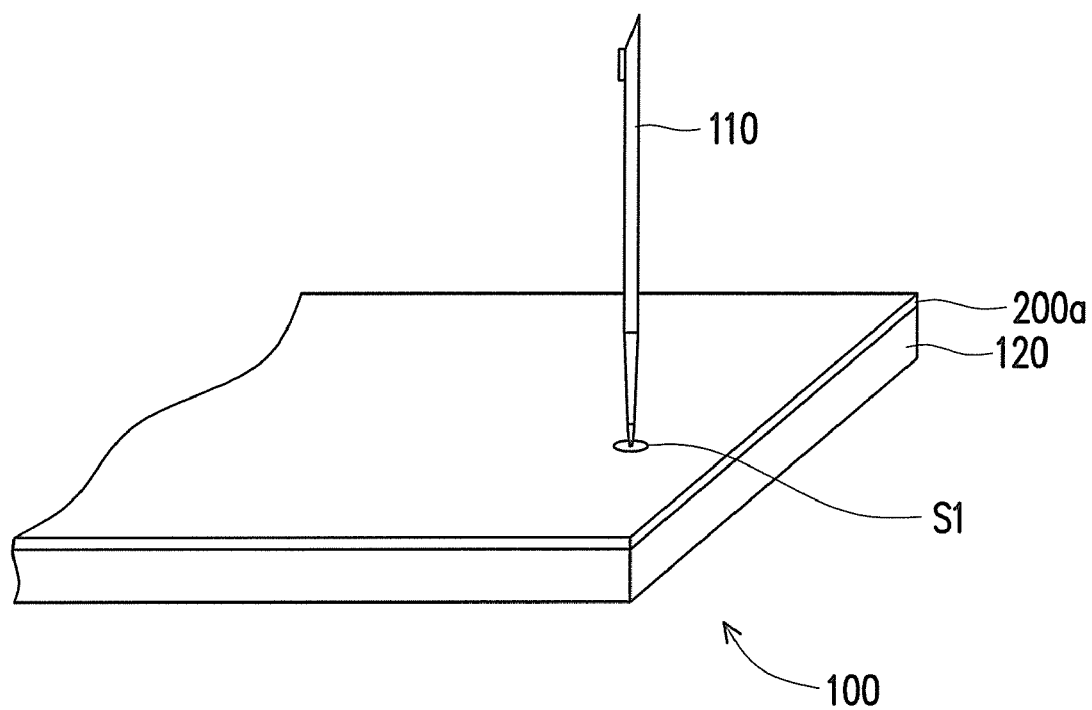
FIG. 1A is a schematic view illustrating a capacitive touch display device according to an embodiment of the invention.
Figure 1B:
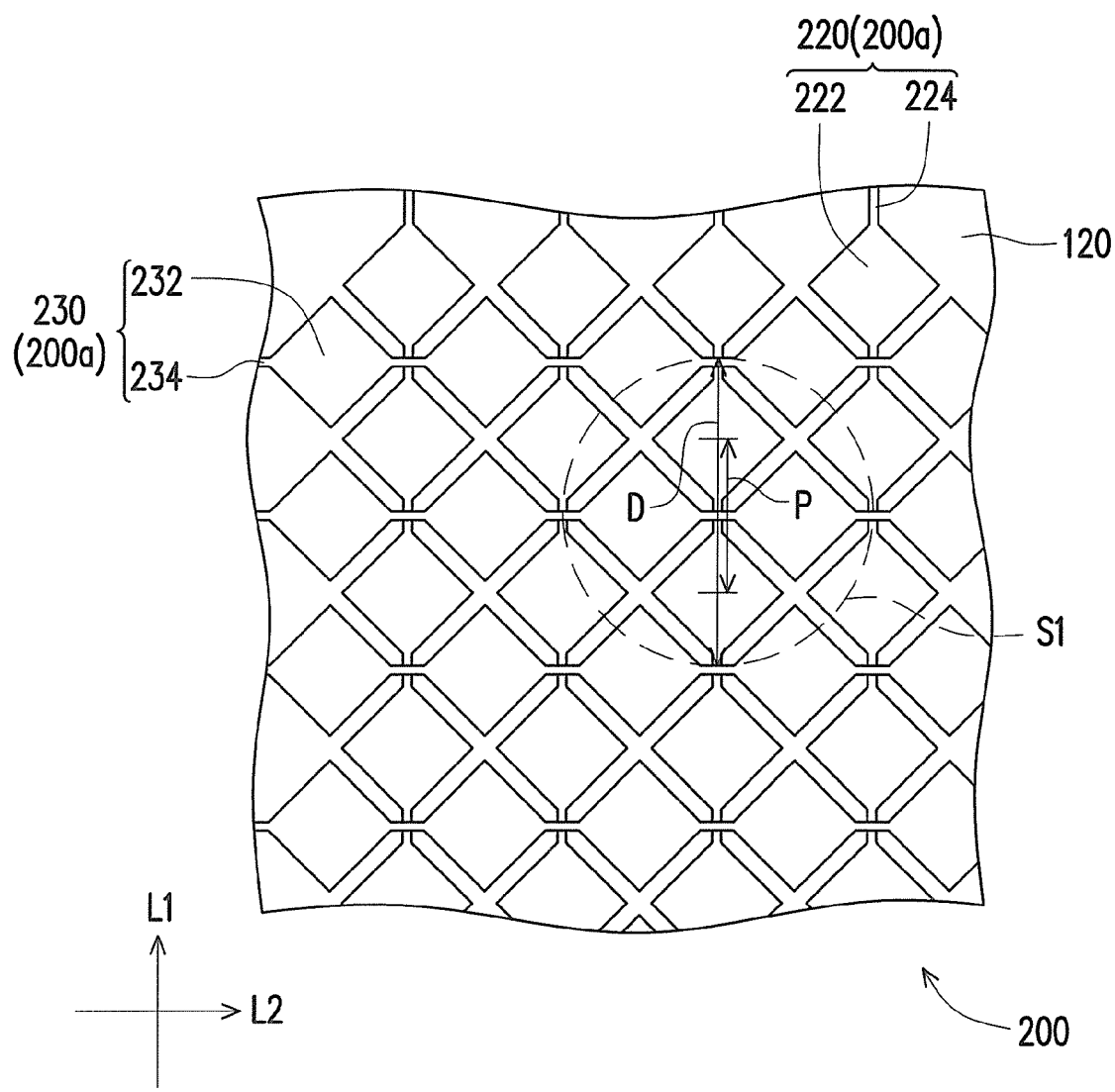
FIG. 1B is a schematic top view illustrating a capacitive touch panel depicted in FIG. 1A.
Figure 4:
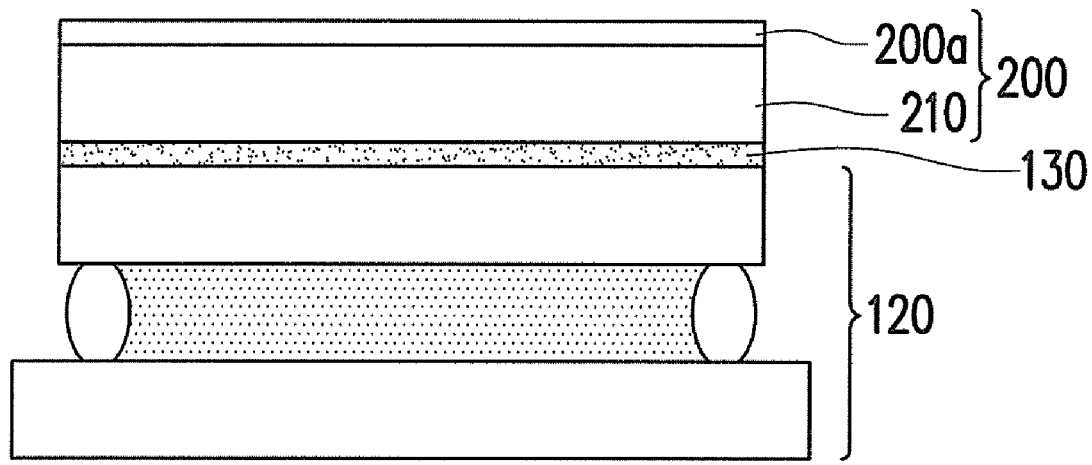
FIG. 4 is a schematic view illustrating an attached capacitive touch unit according to an embodiment of the invention.
Figure 5:
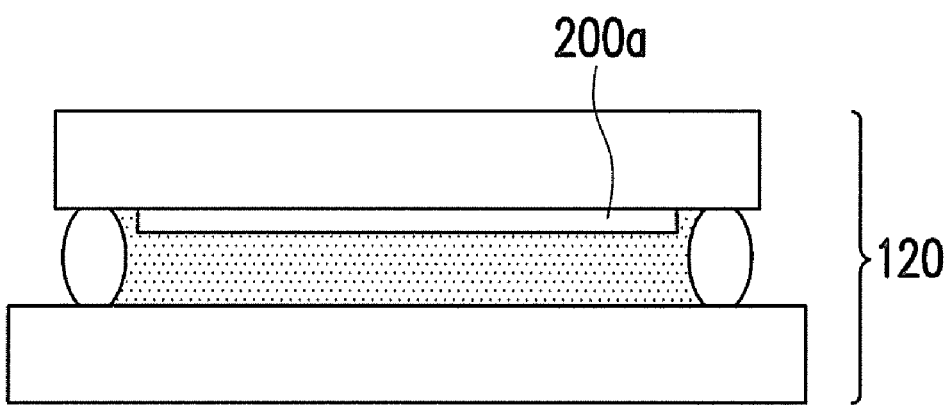
FIG. 5 is a schematic view illustrating an in-cell capacitive touch unit according to an embodiment of the invention.

FIG. 1A is a schematic view illustrating a capacitive touch display device according to an embodiment of the invention.
FIG. 1B is a schematic top view illustrating a capacitive touch panel depicted in FIG. 1A. As shown in FIG. 1A, in this embodiment, a capacitive touch display device 100 includes a stylus 110, a display panel 120, and a capacitive touch unit 200a. Here, the stylus 110 can touch the display panel 120 by clicking to input a touch signal, and the capacitive touch unit 220a is disposed above the display panel 120. In this embodiment, the capacitive touch display device 100 is, for example, a personal digital assistant (PDA), an ultra mobile personal computer (UMPC), a smart phone, or any other display device having a capacitive touch function. More particularly, the capacitive touch unit 200a can have various types, such as a capacitive touch unit formed on an outer surface of the display panel 120, i.e. an on-cell type capacitive touch unit, as shown in FIG. 1A. Alternatively, the capacitive touch unit 200a can be funned on an auxiliary substrate 210, and then a capacitive touch panel 200 adhered to an outer surface of the display panel 120 via an adhesive layer 130 can be formed, i.e. an attached capacitive touch unit as shown in FIG. 4. A capacitive touch unit 200a built in the display panel 120 can also be formed, i.e. an in-cell type capacitive touch unit as shown in FIG. 5. The on-cell type capacitive touch unit is taken as an example to explain the invention below.

To be more specific, as shown in FIG. 1B, the capacitive touch panel 200 includes a display panel 120 and a capacitive touch unit 200a. The display panel 120 is, for example, a liquid crystal display (LCD) panel, an organic light emitting display (OLED) panel, a plasma display panel (PDP), an electro-wetting display (EWD) panel, or an electro-phoretic display (EPD) panel. The capacitive touch unit 200a is disposed on the display panel 120 and includes a plurality of first sensing series 220 and a plurality of second sensing series 230. The first sensing series 220 extend along a first direction L1 and are disposed on the display panel 120. Here, the first sensing series 220 are electrically insulated from one another. The second sensing series 230 extend along a second direction L2 and are disposed on the display panel 120. Here, the second sensing series 230 are electrically insulated from one another. The second direction L2 substantially intersects the first direction L1. Practically, the first direction L1 and the second direction L2 can be perpendicular to each other or intersect at an angle between 0° and 90°, i.e. not including 0°. In this embodiment, the first direction L1 and the second direction L2 are perpendicular to each other, for example.

As indicated in FIG. 1B, each of the first sensing series 220 includes a plurality of first sensing pads 222 and a plurality of first bridge lines 224, and each of the first bridge lines 224 is electrically connected between two adjacent first sensing pads 222. Namely, any two adjacent first sensing pads 222 in the same first sensing series 220 are electrically connected to each other through one of the first bridge lines 224. On the other hand, each of the second sensing series 230 includes a plurality of second sensing pads 232 and a plurality of second bridge lines 234, and each of the second bridge lines 234 is electrically connected between two adjacent second sensing pads 232. Namely, any two adjacent second sensing pads 232 in the same second sensing series 230 are electrically connected to each other through one of the second bridge lines 234. Besides, each of the second bridge lines 234 intersects one of the first bridge lines 224.

In particular, the first sensing pads 222 and the second sensing pads 232 can together form a sensing array to achieve planar sensing. In addition, the first bridge lines 224 do not contact the second bridge lines 234, for example, and the first bridge lines 224 can be located below or above (not shown) the second bridge lines 234. That is to say, the first and the second bridge lines 224 and 234 belong to different film layers. To be more specific, the first and the second sensing pads 222 and 232 can be disposed either on the same plane or on different planes, which is not limited in this invention.

Especially, in this embodiment, the stylus 110 is designed to touch the capacitive touch unit 200a by clicking, so as to input a touch signal. The stylus 110 contacts the capacitive touch unit 200a at a contact area S1 to input the touch signal, and the contact area S1 has a contact width D (or the so-called "effective contact width"). A pitch between any two adjacent first sensing pads 222 is P. Preferably, the ratio of the contact width D to the pitch P between any two adjacent first sensing pads satisfies the following ratio condition: $1.4 \leq (D/P) \leq 1.6$. Here, the pitch P preferably ranges from 4 mm to 10 mm, and the contact width D is determined based on the contact area S1 of the stylus 110 and the capacitive touch panel 200. In detail, as indicated in FIGS. 1A and 1B, the tip of the stylus 110 is frequently regarded as a contact point, and the contact area S1 is formed between the contact point and the capacitive touch panel 200. Based on the design demand, either tip of the stylus can be regarded as the contact point as long as the chosen tip of the stylus 110 satisfies the following condition, which is not limited in this invention. When the contact area S1 between the stylus 110 (as indicated in FIG. 1A) and the capacitive touch panel 200 is a circular contact area, the contact width D of the contact area S1 contacted by the stylus 110 is substantially equal to a diameter of the circular contact area. However, when the contact area S1 between the stylus 110 and the capacitive touch panel 200 is an N-regular polygonal contact area, and N is an even number, the contact width D of the contact area 51 contacted by the stylus 110 is substantially equal to a length of the longest diagonal of the N-regular polygonal contact area.

Figure 1C:
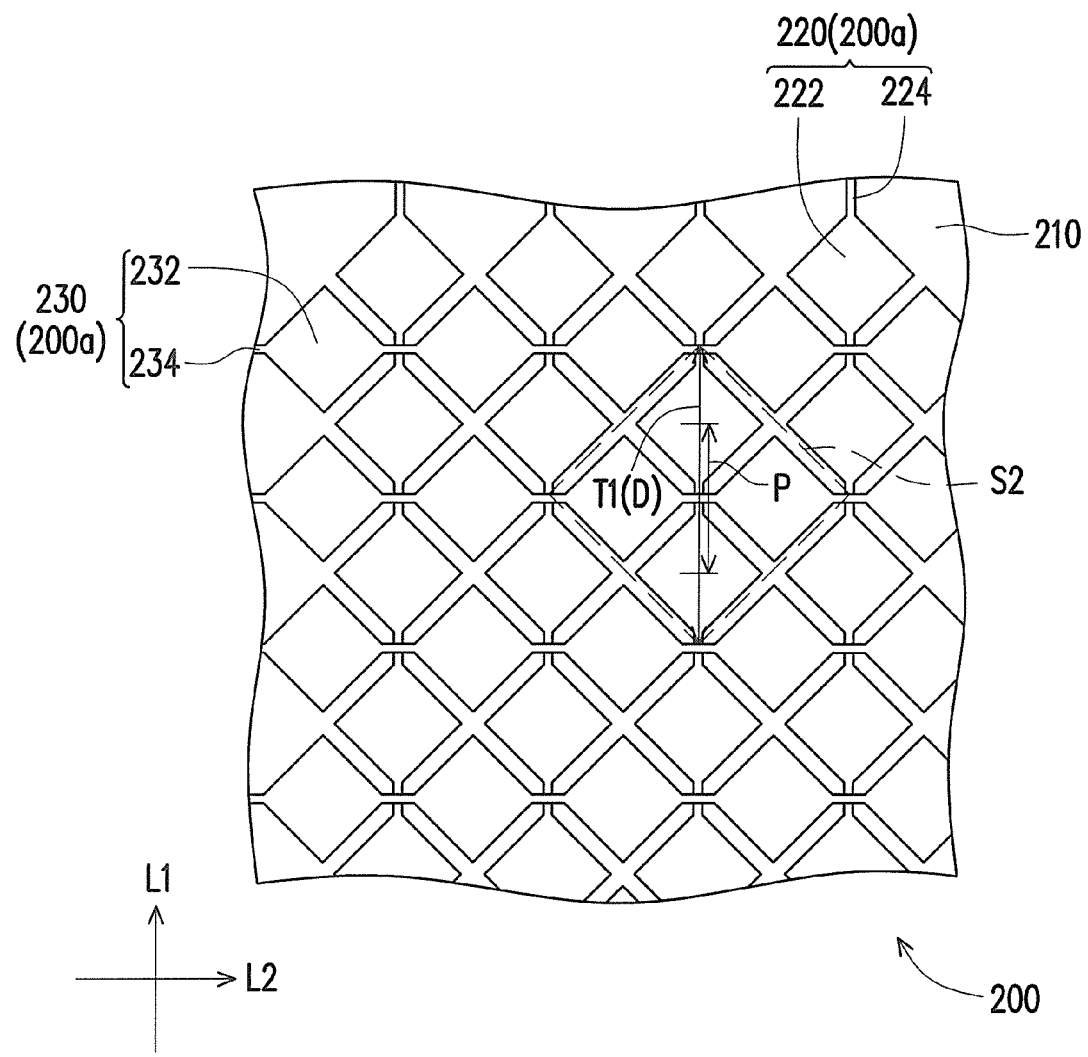
FIG. 1C is a schematic view illustrating a contact area between a stylus and a capacitive touch panel according to another embodiment of the invention.
Figure 1D:
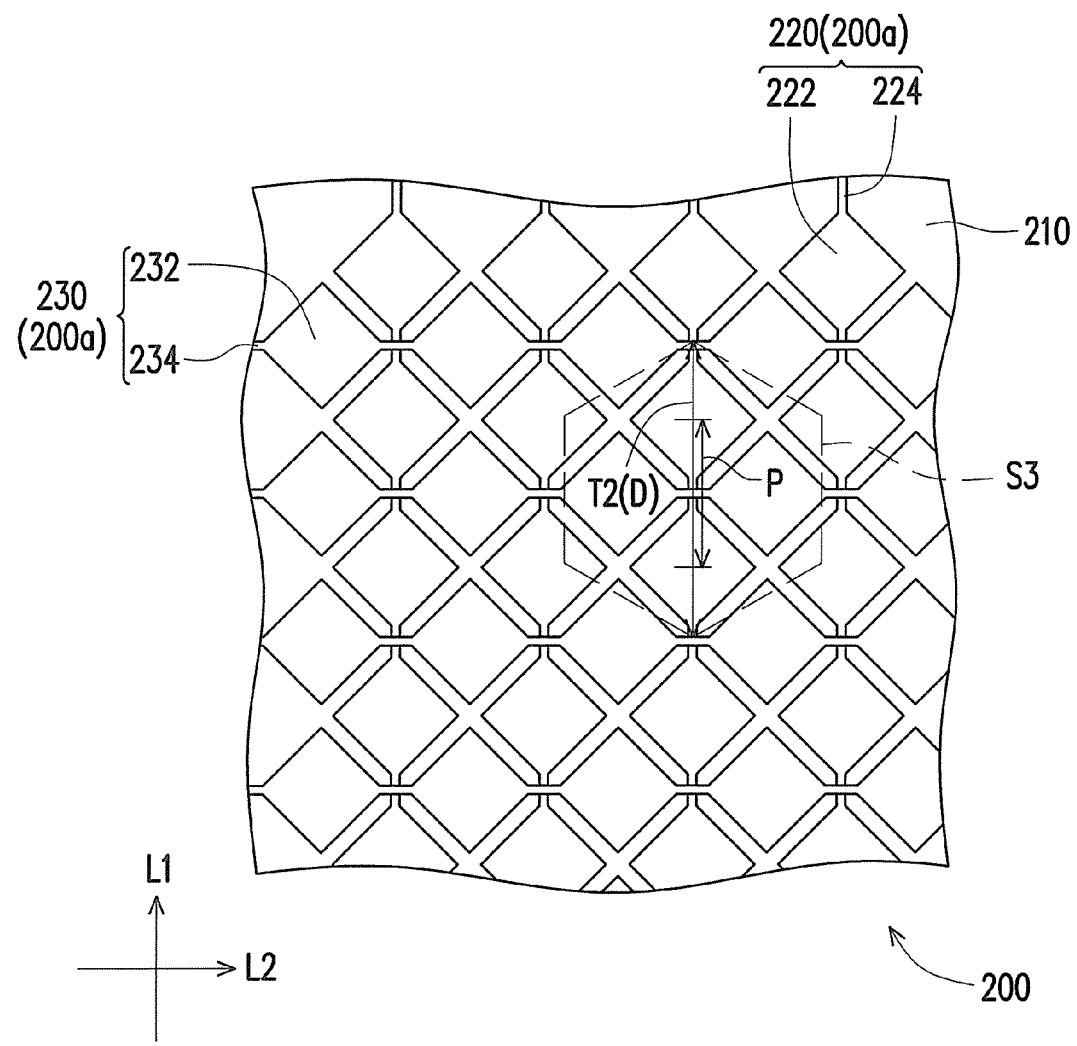
FIG. 1D is a schematic view illustrating a contact area between a stylus and a capacitive touch panel according to still another embodiment of the invention.

For instance, in FIG. 1C, when a contact area S2 between the stylus 110 (as shown in FIG. 1A) and the capacitive touch panel 200 is a regular quadrilateral contact area, i.e. the contact area S2 is a square contact area, the contact width D of the contact area S2 contacted by the stylus 110 is substantially equal to a length T1 of the longest diagonal of the regular quadrilateral contact area. Likewise, in FIG. 1D, when a contact area S3 between the stylus 110 (as shown in FIG. 1A) and the capacitive touch panel 200 is a regular hexagonal contact area, the contact width D of the contact area S3 contacted by the stylus 110 is substantially equal to a length T2 of the longest diagonal of the regular hexagonal contact area. In other words, the contact area S1, S2, or S3 between the stylus 110 and the capacitive touch panel 200 can have other shapes instead of having a circular shape, a regular quadrilateral shape, or a regular hexagonal shape as mentioned above. The contact area S1, S2, or S3 can also have a polygonal shape, such as an irregular shape, an elliptical shape, a rhombic shape, a triangular shape, a star shape, a trapezoidal shape, a pentagonal shape, any proper shape, or a combination thereof.

Besides, according to this embodiment, the contact area S1 (or the contact area S2 or S3) is defined to have an area A ranging from 47.2 mm² to 155 mm². Preferably, a ratio of the area A to the pitch P is $11.8 \text{ mm} \leq (A/P) \leq 15.5 \text{ mm}$. That is to say, in this embodiment, the ratio of the contact width D of the contact area contacted by the stylus 110 to the pitch P between any two adjacent first sensing pads 222 satisfies the ratio condition $1.4 \leq (D/P) \leq 1.6$, which results in improvement of the touch accuracy of the capacitive touch panel 200. Besides, the ratio of the area A of the contact area S1 (or the contact area S2 or S3) to the pitch P between any two adjacent first sensing pads 222 satisfies the ratio condition $11.8 \text{ mm} \leq (A/P) \leq 15.5 \text{ mm}$, which also results in improvement of the touch accuracy of the capacitive touch panel 200. In other words, when the stylus 110 touches the display panel 120 by clicking to input the scripts or patterns, the scripts or the patterns displayed on the display panel 120 resemble the actually input scripts or patterns. As such, the touch accuracy of the capacitive touch panel 200 can be dramatically increased by the design described in this embodiment, and the capacitive touch display device 100 adopting this capacitive touch panel 200 can also have favorable touch accuracy.

Experimental examples are provided below to confirm that the touch accuracy of the capacitive touch panel 200 is significantly improved when the ratio of the contact width D of the contact area contacted by the stylus 110 to the pitch P between any two adjacent first sensing pads 222 satisfies the ratio condition $1.4 \leq (D/P) \leq 1.6$. Thereby, the scripts or the patterns displayed on the display panel 120 resemble the actually input scripts or patterns.

Experimental Examples

Figure 2:
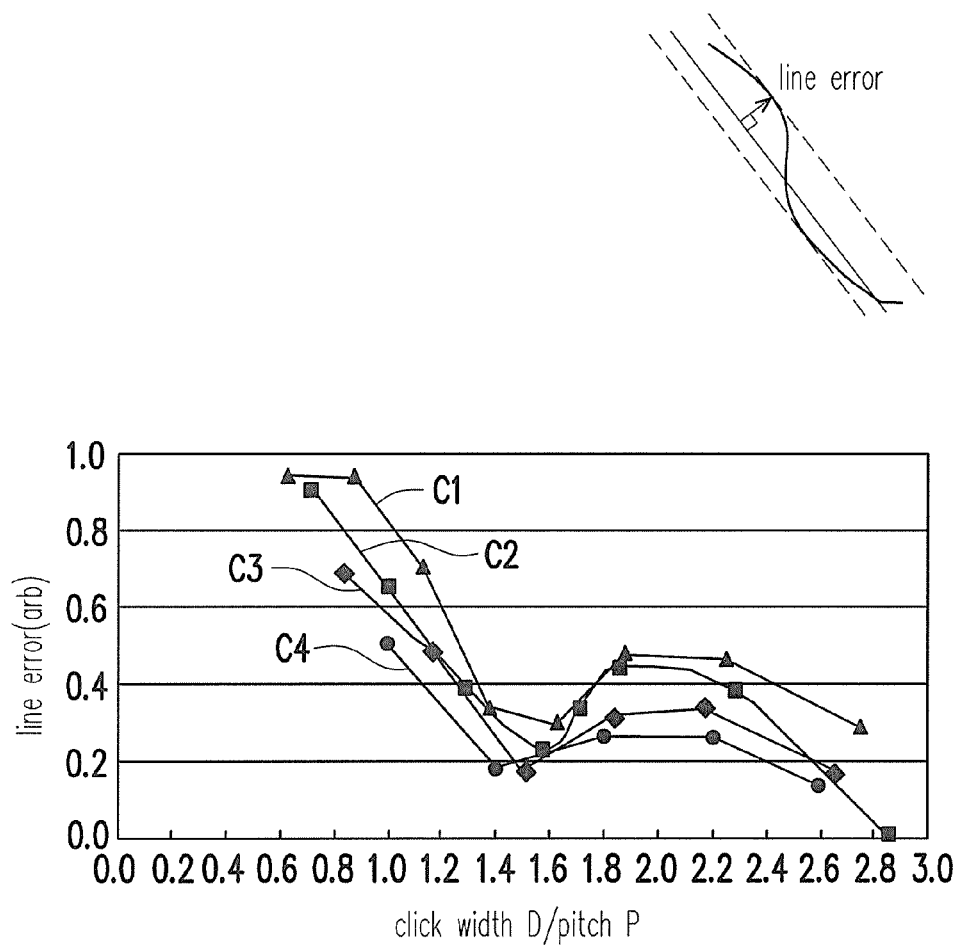
FIG. 2 is a broken line graph illustrating line errors and a ratio of a contact width of a contact area contacted by a stylus to a pitch between any two adjacent first sensing pads.

In this invention, the experiments are made with respect to the contact width D (unit: millimeter; mm) of the contact area contacted by the stylus 110 (see FIG. 1A), the pitch P (unit: millimeter; mm) between any two adjacent first sensing pads 222, and line errors of the scripts or the patterns displayed on the display panel 200. With reference to FIG. 2, in this embodiment, the pitch P of 8 mm, 7 mm, 6 mm, and 5 mm respectively corresponds to a broken line C1, a broken line C2, a broken line C3, and a broken line C4, and the line errors range from 0.0 mm to 2.4 mm. The styluses 110 with different tip sizes are used in the experiments to achieve different contact widths D. X axis represents the ratio (D/P) of the contact width D and the pitch P between any two adjacent first sensing pads 222 (see FIG. 1B), and the range of X is set from 0.0 to 3.0. Y axis represents line errors, and a normalized range of the line errors is set from 0 to 1.

Particularly, it can be learned from the broken lines C1, C2, C3, and C4 depicted in FIG. 2 that the line error at the broken lines C1, C2, C3, and C4 reaches the minimum value and is less than 0.35 when the ratio (D/P) of the contact width D of the contact area contacted by the stylus 110 (see FIG. 1A) to the pitch P between any two adjacent first sensing pads 222 (see FIG. 1B) satisfies the ratio condition $1.4 \leq (D/P) \leq 1.6$. Under said condition, the thinnest font style can be presented, the best touch sensing effect can be achieved, and the line error is not likely to be generated. Here, the contact width D of the contact area contacted by the stylus 110 is referred to as the effective contact width. Namely, after the stylus 110 (see FIG. 1A) inputs the scripts or patterns by clicking, the scripts or the patterns displayed on the display panel 120 (see FIG. 1A) resemble the actually input scripts or patterns.

Figure 3A:
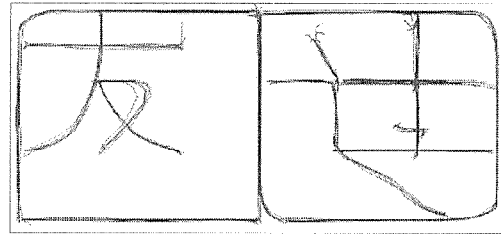
FIGS. 3A to 3D are schematic views illustrating scripts displayed on a display panel when various ratios of a contact width of a contact area contacted by a stylus to a pitch between any two adjacent first sensing pads are given.
Figure 3B:
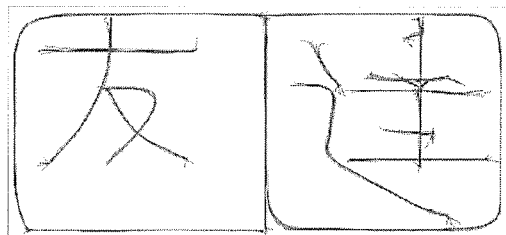
Figure 3C:
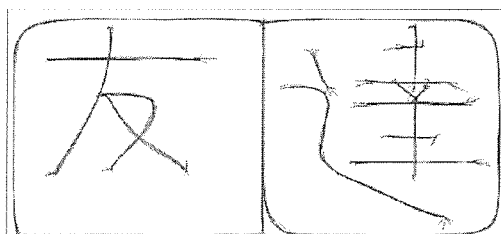
Figure 3D:
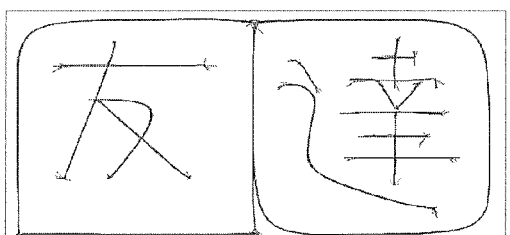

As indicated in FIG. 3A, for instance, when the ratio (D/P) is 0.65, the line error reaches 0.8 or more. After the stylus 110 (see FIG. 1A) inputs the Chinese scripts "友達" by contacting or drawing, the scripts displayed on the display panel 120 (see FIG. 1A) are illegible. Additionally, with reference to FIGS. 3B and 3C, when the ratio (D/P) reaches 0.91 or even 1.17 from 0.65, the Chinese scripts "友達" that are input by the stylus 110 and displayed on the display panel 120 are clearer than those shown in FIG. 3A, while the touch accuracy is still not the best. That is to say, even though the line error (greater than 0.8) is reduced to 0.6 approximately or even 0.35, there are distorted and shifted of the scripts displayed on the display panel 120. Finally, in FIG. 3D, when the ratio (D/P) reaches 1.43, the line error is reduced to 0.35 or less, and the Chinese scripts "友達" that are input by the stylus 110 and displayed on the display panel 120 relatively resemble the actually input scripts. Namely, the non-distorted scripts displayed on the display panel 120 can be precisely read as "友 達". Nonetheless, when the ratio (D/P) is greater than 2.0, the font style is excessively bold, and it is rather difficult to input the scripts with the desired font style.

In brief, when the ratio of the contact width D of the contact area contacted by the stylus 110 to the pitch P between any two adjacent first sensing pads 222 satisfies the ratio condition $1.4 \leq (D/P) \leq 1.6$, the line error of the scripts or patterns input by the stylus 110 is the least, and the scripts or patterns displayed on the display panel 120 relatively resemble the actually input scripts or patterns. Namely, when the ratio of the contact width D of the contact area contacted by the stylus 110 to the pitch P between any two adjacent first sensing pads 222 satisfies the ratio condition $1.4 \leq (D/P) \leq 1.6$, the touch accuracy of the capacitive touch panel 200 can be effectively improved, and the capacitive touch display device 100 adopting this capacitive touch panel 100 can have favorable touch accuracy as well.

In light of the foregoing, according to the design of the capacitive touch panel in the invention, the ratio of the contact width D of the contact area contacted by the stylus to the pitch P between any two adjacent first sensing pads satisfies the following ratio condition: $1.4 \leq (D/P) \leq 1.6$. Hence, when the stylus touches the display panel by clicking to input the scripts or patterns, the scripts or the patterns displayed on the display panel resemble the actually input scripts or patterns. That is to say, said design can effectively improve the touch accuracy of the capacitive touch panel, and the capacitive touch display device adopting this capacitive touch panel can also have favorable touch accuracy. Besides, the ratio of the area A of the contact area to the pitch P between any two adjacent first sensing pads satisfies the ratio condition $11.8 \text{ mm} \leq (A/P) \leq 15.5 \text{ mm}$, which also results in improvement of the touch accuracy of the capacitive touch panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A capacitive touch display device, comprising:
    a stylus;
    a display panel;
    a capacitive touch unit disposed on the display panel, wherein the stylus contacts the capacitive touch unit at a contact area to input a touch signal, the capacitive touch unit comprising:
        a plurality of first sensing series, each of the plurality of first sensing series comprising a plurality of first sensing pads electrically connected to one another, wherein a pitch between any two adjacent first sensing pads of the plurality of first sensing series is P; and
        a plurality of second sensing series intersecting the plurality of first sensing series, wherein the contact area contacted by the stylus has a contact width D, and a ratio of the contact width D to the pitch P between any two adjacent first sensing pads satisfies the following ratio condition: $1.4 \leq (D/P) \leq 1.6$.

2. The capacitive touch display device as claimed in claim 1, wherein any two adjacent first sensing pads of the plurality of first sensing pads in the same first sensing series are electrically connected to each other through a first bridge line.

3. The capacitive touch display device as claimed in claim 1, wherein each of the plurality of second sensing series comprises a plurality of second sensing pads electrically connected to one another.

4. The capacitive touch display device as claimed in claim 3, wherein any two adjacent second sensing pads of the plurality of second sensing pads in the same second sensing series are electrically connected to each other through a second bridge line.

5. The capacitive touch display device as claimed in claim 1, wherein the contact area between the stylus and the capacitive touch unit is a circular contact area.

6. The capacitive touch display device as claimed in claim 5, wherein the contact width D of the contact area contacted by the stylus is substantially equal to a diameter of the circular contact area.

7. The capacitive touch display device as claimed in claim 1, wherein the contact area between the stylus and the capacitive touch unit is an N-regular polygonal contact area, and N is an even number.

8. The capacitive touch display device as claimed in claim 7, wherein the contact width D of the contact area contacted by the stylus is substantially equal to a length of the longest diagonal of the N-regular polygonal contact area.

9. The capacitive touch display device as claimed in claim 1, wherein the pitch P ranges from 4 mm to 10 mm.

10. The capacitive touch display device as claimed in claim 9, wherein an area of the contact area is A ranging from 47.2 mm$^2$ to 155 mm$^2$, and $11.8 \text{ mm} \leq (A/P) \leq 15.5 \text{ mm}$.

11. A capacitive touch panel suitable for a user to use a stylus contacting the capacitive touch panel at a contact area to input a touch signal, the capacitive touch panel comprising:
    a display panel;
    a plurality of first sensing series disposed on the display panel, each of the plurality of first sensing series comprising a plurality of first sensing pads electrically connected to one another, wherein a pitch between any two adjacent first sensing pads of the plurality of first sensing series is P; and
    a plurality of second sensing series disposed on the display panel and intersecting the plurality of first sensing series, wherein the contact area contacted by the stylus has a contact width D, and a ratio of the contact width D to the pitch P between any two adjacent first sensing pads satisfies the following ratio condition: $1.4 \leq (D/P) \leq 1.6$.

12. The capacitive touch panel as claimed in claim 11, wherein any two adjacent first sensing pads of the plurality of first sensing pads in the same first sensing series are electrically connected to each other through a first bridge line.

13. The capacitive touch panel as claimed in claim 11, wherein each of the plurality of second sensing series comprises a plurality of second sensing pads electrically connected to one another.

14. The capacitive touch panel as claimed in claim 13, wherein any two adjacent second sensing pads of the plurality of second sensing pads in the same second sensing series are electrically connected to each other through a second bridge line.

15. The capacitive touch panel as claimed in claim 11, wherein the contact area between the stylus and the capacitive touch panel is a circular contact area.

16. The capacitive touch panel as claimed in claim 15, wherein the contact width D of the contact area contacted by the stylus is substantially equal to a diameter of the circular contact area.

17. The capacitive touch panel as claimed in claim 11, wherein the contact area between the stylus and the capacitive touch panel is an N-regular polygonal contact area, and N is an even number.

18. The capacitive touch panel as claimed in claim 17, wherein the contact width D of the contact area contacted by the stylus is substantially equal to a length of the longest diagonal of the N-regular polygonal contact area.

19. The capacitive touch panel as claimed in claim 11, wherein the pitch P ranges from 4 mm to 10 mm.

20. The capacitive touch panel as claimed in claim 19, wherein an area of the contact area is A ranging from 47.2 mm$^2$ to 155 mm$^2$, and 11.8 mm$\leq$(A/P)$\leq$15.5 mm.

* * * * *